United States Patent [19]
Shiota

[11] Patent Number: 5,795,674
[45] Date of Patent: Aug. 18, 1998

[54] BATTERY HAVING IMPROVED SAFETY FEATURES

[75] Inventor: Masatsugu Shiota, Fukushima, Japan

[73] Assignee: Sony Corporation, Tokyo, Japan

[21] Appl. No.: 819,726

[22] Filed: Mar. 18, 1997

[30] Foreign Application Priority Data

Mar. 18, 1996 [JP] Japan .................................. 8-061545

[51] Int. Cl.[6] .................................................. H01M 2/12
[52] U.S. Cl. .............................. 429/54; 429/56; 429/197; 429/224
[58] Field of Search ........................ 429/53, 54, 56, 429/171, 172, 174, 177, 185, 163, 194, 197, 224, 218

[56] References Cited

U.S. PATENT DOCUMENTS

| | | | |
|---|---|---|---|
| 4,227,701 | 10/1980 | Tsuchida et al. | 429/56 X |
| 5,376,467 | 12/1994 | Abe et al. | 429/163 X |
| 5,427,875 | 6/1995 | Yamamoto et al. | 429/53 X |
| 5,455,128 | 10/1995 | Tanaka | 429/53 X |
| 5,462,820 | 10/1995 | Tanaka | 429/174 |
| 5,677,076 | 10/1997 | Sato et al. | 429/56 |
| 5,702,840 | 12/1997 | Byon | 429/53 |

*Primary Examiner*—Anthony Skapars
*Attorney, Agent, or Firm*—Hill & Simpson

[57] ABSTRACT

An improved safety battery exhibiting excellent safety features and capable of preventing ejection and spraying of the contents thereof when the safety valve has been ruptured, and having a safety valve which cannot be pierced unintentionally or intentionally by a child or the like is provided. In a preferred embodiment, a cylindrical nonaqueous-electrolyte battery is provided including a safety valve and a battery cover arrangement defining first and second venting cavities which are disposed under cover, to reduce or eliminate direct spraying discharge of the battery contents and to prohibit outside access to venting openings.

8 Claims, 2 Drawing Sheets

BATTERY HAVING IMPROVED SAFETY FEATURES

BACKGROUND OF THE INVENTION

The present invention relates to secondary cells or batteries, and more particularly, to a battery having a new and improved safety mechanism providing improved safeguards in the event of an internal pressure rise within the battery.

In recent years, the trends for electronic equipment have included improving the performance, reducing the size thereof and realizing a portable structure. For example, nonaqueous-electrolyte batteries exhibiting in high potential, light weight, excellent performance and long life, have been widely used. However, if the nonaqueous-electrolyte battery has a sealed type structure, the internal pressure of the battery may rise due to several factors. More particularly, there is a risk that the battery may burst in cases where the battery is used at high temperatures or is charged with a high voltage level. Accordingly, nonaqueous-electrolyte batteries of this type are provided with a safety valve having safety mechanism such as a pressure release valve in the form of a rupturable membrane or the like which opens at a predetermined internal pressure of the battery so as to relieve the internal pressure in order to prevent bursting of the battery.

For example, a cylindrical nonaqueous-electrolyte battery, such as a cylindrical manganese-lithium battery which is employed widely in cameras or the like, is generally provided with a battery cover having an opening at a terminal portion thereof A film type safety valve, formed by laminating metal foil and plastic is disposed on the inside of the battery cover.

When the internal pressure of a battery, having the above described valve, rises, the film tears opening the safety valve. In this manner, when the predetermined internal pressure is reached or exceeded, the valve ruptures, venting the battery to a first degree to thereby relieve the raised internal pressure. Thereafter, additional internal pressure is relieved through a small hole or opening provided in the battery cover so that bursting of the battery is prevented.

However, the above-mentioned safety mechanism has a risk in that the contents of the battery such as the electrolyte may be directly ejected with the gas. Moreover, if a needle-like member is inserted from outside through the opening formed in the terminal portion of the battery cover of the above-mentioned battery, the membrane in the safety valve may be prematurely ruptured. If this happens, the contents of the battery may leak, a short-circuit of the battery may occur, or if a high internal pressure condition occurs, the battery contents may be forcefully sprayed out of the opening in the cover member.

SUMMARY OF THE INVENTION

In view of the foregoing, an object of the present invention is to provide a safety battery capable of preventing ejection and spraying of the contents of the battery when the safety valve has been vented and protecting the safety valve from being unintentionally or intentionally pierced or tampered with.

In an embodiment, a new and improved safety battery comprises: a battery can including a top opening bounded by a peripheral lip and defining an electrode-receiving cavity. An electrode assembly including at least one anode, at least one cathode and at least one separator disposed between the anode and the cathode, is disposed in the electrode-receiving cavity. An electrolyte is disposed in the electrode-receiving cavity. A safety valve is disposed in the electrode-receiving cavity adjacent the top opening. A battery cover including a raised central portion is disposed in the top opening and sealably closes off the top opening. The battery cover cooperates with the battery can and the safety valve to define a first venting chamber disposed between the safety valve and the raised central portion. A secondary cover member is disposed on an outside surface of the battery cover extending between the raised central portion and the peripheral lip. The secondary cover cooperates with the peripheral lip and the battery cover to define a second venting chamber under the secondary cover member. The raised central portion of the battery cover is provided with an opening connecting the first venting chamber to the second venting chamber under the secondary cover. In accordance with this embodiment internal pressure within the battery can is relieved by opening of the safety valve, permitting venting into the first venting cavity and thereafter further venting proceeds from the first venting cavity into the covered and protected second venting cavity. Controlled venting into the second venting cavity reduces or eliminates the possibility of harmful or dangerous spraying of gas and electrolyte from the battery.

According to the invention, a nonaqueous-electrolyte battery has a safety valve, arranged to be vented when internal pressure of the battery has been raised, and disposed on the inside of a battery cover which also serves as a terminal, an opening for relieving pressure when the safety valve has been vented, wherein the opening is covered by an insulating cover so that the opening cannot directly be recognized from outside.

In accordance with a preferred embodiment, the battery cover has a profiled configuration including a central cylindrical projection projecting outwards, a flat portion, formed in the radially outer peripheral portion of the battery cover, which may be caulked or crimped by a battery can and a gasket, and an intermediate stepped portion formed concentrically between the projection and the flat portion. The opening is formed in the stepped portion.

According to the present invention, as described above, the nonaqueous-electrolyte battery has the structure such that the opening in the battery cover is also covered by an insulating cover and formed at a position at which it cannot directly be recognized from outside. Therefore, even if gas is ejected from the inside of the battery, direct ejection of the contents of the battery can be prevented. Additionally since the opening is not placed on the outside surface of the battery, the safety valve cannot easily be pierced from outside.

Other objects and advantages provided by the present invention will become apparent from the following Detailed Description, taken in conjunction with the drawings in which:

DETAILED DESCRIBED OF THE PREFERRED EMBODIMENT

A preferred embodiment of the cylindrical nonaqueous-electrolyte battery according to the present invention will now be described with reference to the drawings.

Figure 1:
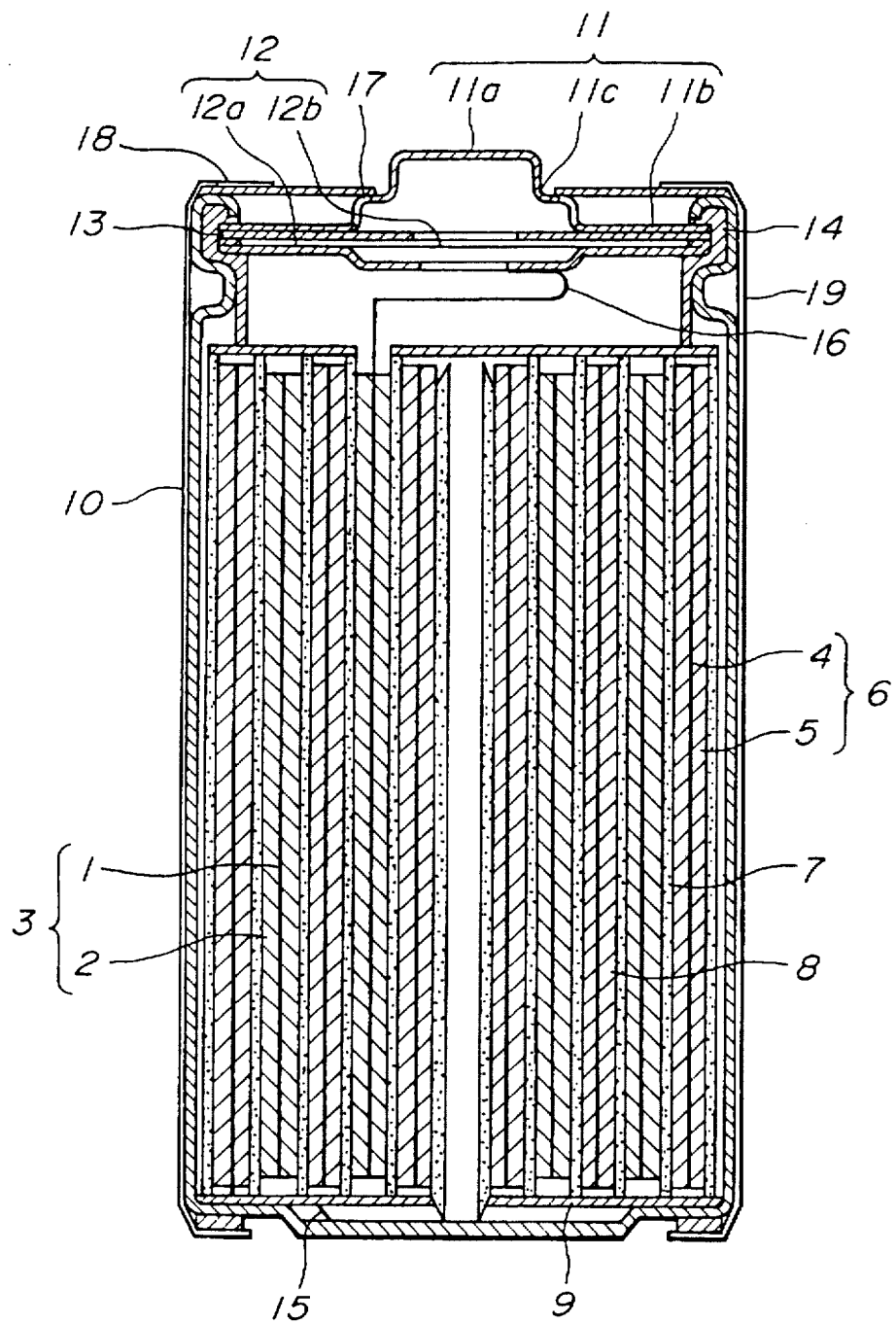
FIG. 1 is an elevated cross-sectional view of a nonaqueous-electrolyte battery according to the present invention.

The cylindrical nonaqueous-electrolyte battery, as shown in FIG. 1, has a cathode 3 formed by applying a cathode active material 2 to a cathode collector 1; and an anode 6 formed by applying an anode active material 5 to the anode collector 4. The cylindrical nonaqueous-electrolyte battery has a structured such that a laminated electrode is formed by sequentially laminating the cathode 3, a separator 7, an anode 6 and a separator 7 in this sequential order; insulating members 9 are respectively disposed at the two vertical ends of a electrode body 8 wound the laminated electrode by a multiplicity of times. The electrode body 8 and the insulating members 9 are accommodated in a battery can 10 having an outer diameter of 17 mm and a height of 34 mm. The electrode body 8 is previously adjusted to have a length and a width so as to appropriately be accommodated in the battery can 10.

A safety unit 12 and a PTC element 13 are disposed on the inside of the battery cover 11. The battery cover 11, the safety unit 12, and the PTC element are caulked by a gasket 14, and attached to the battery can 10 which accommodates the electrode body 8. The battery can 10 is electrically connected to the anode 6 through an anode lead 15. The battery cover 11 is electrically connected to the cathode 3 through a cathode lead 16 welded to the safety unit 12.

The battery cover 11 is composed of a projection 11a projecting outwards, a flat portion 11b formed on the outer periphery of the projection 11a and caulked by the battery can 10 and the gasket 14, and a stepped portion 11c formed concentrically between the projection 11a and the flat portion 11b. The stepped portion 11c has an opening 17 for relieving pressure when the safety valve has been vented. A cover 18 made of propylene is disposed on the stepped portion 11c of the battery cover 11 to cover the opening 17. The cover is held by thermally shrinking an exterior label 19, made of shrink-wrap plastic, having an adhesive agent applied on an inner surface thereof Then, the cylindrical nonaqueous-electrolyte battery having a diameter of 17 mm and a height of 34 mm is manufactured.

The safety unit 12 is formed such that the outer portion of a safety valve 12b is thermally welded to a safety-valve case 12a made of stainless steel and then caulked by a safety-valve retainer made of stainless steel. The safety valve 12b is formed into a film-like shape by laminating a polyethylene resin having a thickness of 40 μm on aluminum foil having a thickness of 20 μm. The safety unit 12, having the safety valve 12b, is arranged to be vented to release the internal pressure when the internal pressure of the battery has been raised to a level more than a predetermined level. The PTC element 13 is a thermo-resistive element such that its electrical resistance increases with increasing temperature of the battery, so that electric current may be interrupted under an adverse heating condition.

If the internal pressure of the cylindrical nonaqueous-electrolyte battery shown in FIG. 1 is raised for some reason, the safety valve 12b is vented to relieve the internal pressure into a first venting chamber 30. Since the opening 17 formed in the battery cover 11 is covered by the cover 18, the contents in the battery are accumulated in the second venting chamber 32 defined in the inner side of the cover 18 and therefore the contents do not directly eject from the opening 17. Since the cylindrical nonaqueous-electrolyte battery has the opening 17 formed at a position at which it is covered by the cover 18 and it cannot be recognized from outside, a needle like member cannot be inserted into the opening 17. As a result, the safety valve 12b cannot easily be pierced unintentionally or intentionally.

The materials for the cathode, the anode and the electrolyte of the cylindrical nonaqueous-electrolyte battery according to the present invention are not limited particularly. Active materials which can be employed will now be described.

As a cathode active material for the nonaqueous-electrolyte primary battery, manganese dioxide, carbon fluoride, FeS, $FeS_2$, CuO or the like is employed. As an anode active material, lithium metal or a material obtained by alloying lithium metal with Al, Pb, In or the like is employed.

As a material for the cathode active material of the nonaqueous-electrolyte secondary battery, a material capable of reversibly intercalating, i. e., inserting/removing lithium ions is employed. For example, $TiS_2$, $MoS_2$, $V_2O_5$, $V_6O_{13}$, $MnO_2$, $LiNi_xCo_yO_2$, $LiMn_4$, $LiMnO_2$ or the like can be used.

As an anode active material of the nonaqueous-electrolyte secondary battery, lithium metal or a material obtained by alloying lithium metal with Al, Pb, In or the like is employed. By using a carbon material capable of occluding and discharging lithium, a battery having an improved cycle characteristic can be obtained. Although the carbon material for forming the anode is not limited particularly, it can be obtained by thermally-decomposing or baking and carbonizing any one of a variety of organic compounds. Also a graphitized material may be employed.

Further, at least one opening 17 is formed in the battery cover 11 at a position at which the opening 17 cannot be recognized from outside, the shape and arrangement of the opening 17 may arbitrarily be selected.

Figure 2:
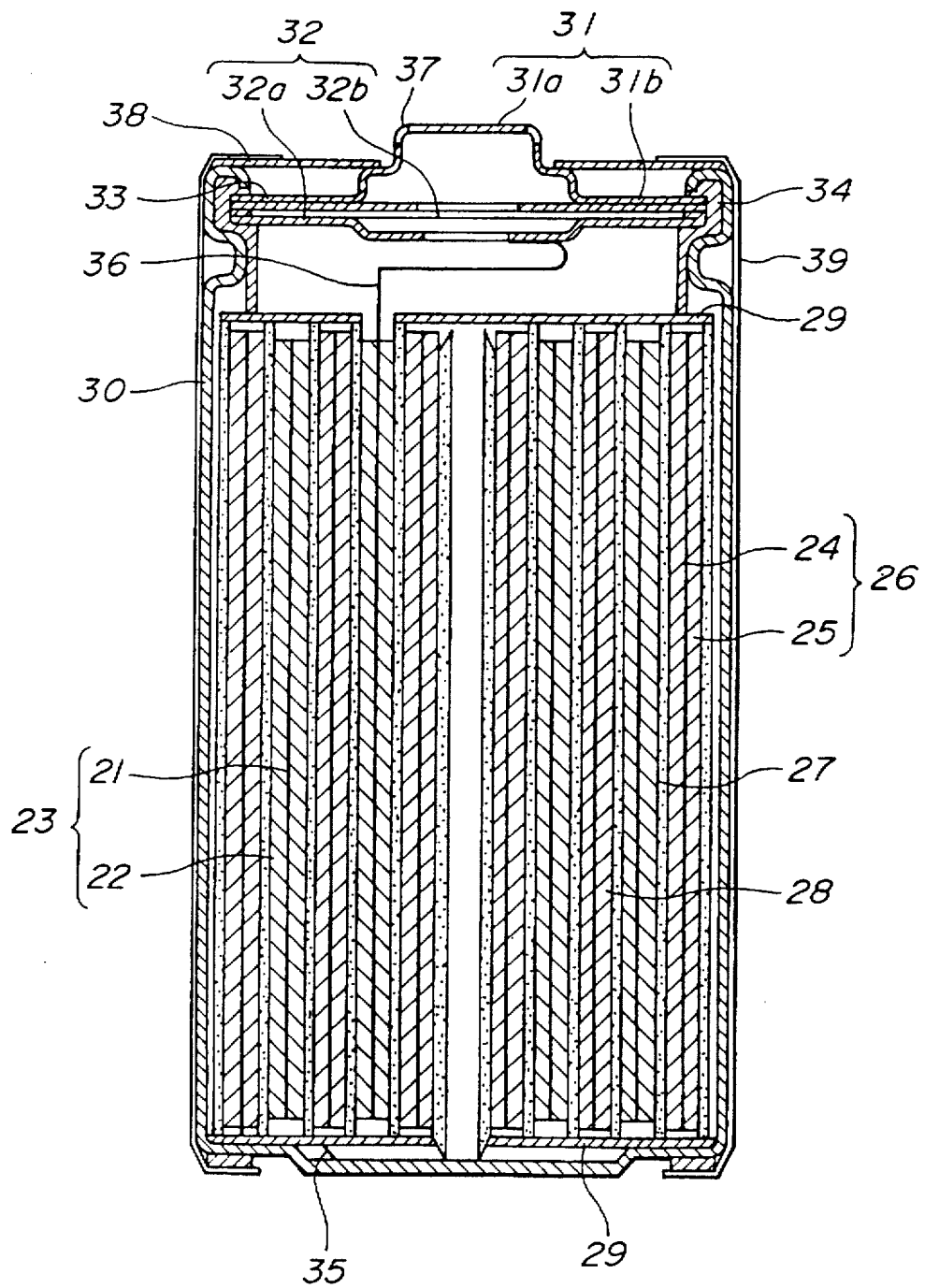
FIG. 2 is an elevated cross-sectional view of a prior art nonaqueous-electrolyte battery provided for purposes of comparison.

In order to confirm effects of the present invention, the above-mentioned nonaqueous-electrolyte battery (Example 1 ) and a conventional cylindrical nonaqueous-electrolyte battery (Comparative Example 1 ) shown in FIG. 2 were respectively manufactured.

EXAMPLE 1

As the cathode 3, 90 wt % of a heat treated $MnO_2$ serving as the cathode active material 2, 6 wt % of graphite serving as a conductive material and 4 wt % of polytetrafluoroethylene serving as a binder were mixed so that a cathode composite material was manufactured. The composite material was combined with an elongated expand metal which is made of stainless steal and serves as the cathode collector 1, and then the combined material was shaped into an elongated form. As the anode 6, a lithium foil was employed. The cathode 3 and the anode 6 were wound interposing a separator 7 made of micro-porous polyethylene film so that an electrode body 8 was manufactured.

The electrode body 8 was accommodated in the battery can 10, and then a nickel negative lead 15 was led from the anode collector 4 so as to be welded to the battery can 10. Then, a gasket 14 coated with asphalt was introduced into the battery can 10, and then a cathode lead 16 made of stainless steel was led from the cathode collector so as to be welded to the safety-valve case 12a.

Then, an electrolyte, containing 0.7 mol/l of $LiCF_3SO_3$ dissolved in a mixed solvent containing 60 parts by weight of propylene carbonate and 40 parts by weight of dimethoxyethane, was injected into the battery can 10. Then, the safety unit 12 and the battery cover 11 having the opening 17 were attached to the battery can 10 interposing the gasket 14. Then, the cover 18 was attached on the battery cover 11 and the battery can 10 and held by the exterior label 19 so that the opening 17 was covered by the cover 18. Then, the nonaqueous-electrolyte battery of Example 1 was obtained.

Comparative Example 1

A nonaqueous-electrolyte battery was manufactured in the same way as Example 1 except a battery cover 31 being used in place of the battery cover 11.

As shown in FIG. 2, the nonaqueous-electrolyte battery has a cathode 23 formed by applying a cathode active material 22 to a positive collector 21; and an anode 26 formed by applying an anode active material 25 to an anode collector 24. The nonaqueous-electrolyte battery was manufactured such that the cathode 23, a separator 27, an anode 26 and a separator 27 were laminated in this sequential order so that a laminated electrode was formed; an insulating member 29 was disposed on each of the two vertical ends of a electrode body 28 formed by winding the laminated electrode by a multiplicity of times; and then the electrode body 28 and the insulating member were accommodated in a battery can 30.

A battery cover 31 and a safety unit 32 and a PTC element 33, which was disposed on the inside of the battery cover 31, was caulked by a gasket 34 so as to be attached to the battery can 30 accommodating the electrode body 28. The battery can 30 was electrically connected to the anode 6 through an anode lead 35, while the battery cover 31 was electrically connected to the cathode 23 through a cathode lead 36 welded to a safety unit 32. The battery cover 31 has, in a terminal portion 31a thereof, an opening 37 for relieving pressure generated when the safety valve has been vented at a position at which the opening 37 can be recognized from outside. Moreover, a cover 38 made of polypropylene is disposed on the battery cover 31. Then, an exterior label 39, the basic 30 material of which is a plastic film having a inner surface coated with an adhesive agent is shrunken by heat so as to hold the cover 38 so that the cylindrical nonaqueous-electrolyte battery of the Comparative Example 1 is manufactured.

The safety unit 32 is formed such that the outer periphery of a safety valve 32b is thermally welded to a safety valve case 32a made of stainless steel; and the safety valve 32b is caulked by a safety-valve retainer made of stainless steel. The safety unit 32 having the safety valve case 32a is arranged such that the film-type safety valve 32b is torn to relieve the internal pressure when the internal pressure of the battery has been raised to a level more than a predetermined level. The PTC element 33 is arranged such that its resistance value is enlarged to interrupt the electric current when the temperature of the battery has been raised. In order to make a comparison with Example 1, the cathode 23, the separator 27, the anode 26 and the safety unit 32 are the same as those of Example 1.

The batteries according to Example 1 and Comparative Example 1 were electrically charged with 5 V determined on an assumption of erroneous operation. As a result, gas was ejected in both of Example 1 and Comparative Example 1. As compared with Example 1 in which the electrolyte was scattered within 2 cm, electrolyte was scattered by 9 cm in Comparative Example 1.

Then, a needle was inserted into the opening of the battery cover of each of the batteries according to Example 1 and Comparative Example 1. Since the opening of the battery according to Example 1 was covered and it was not exposed outside, the needle could not be inserted. With the battery according to Comparative Example 1, the needle could easily be inserted through the opening to pierce the safety valve. As a result, the electrolyte was exposed.

Accordingly, the nonaqueous-electrolyte battery, having the structure such that the opening 17 formed in the battery cover 11 is covered with the cover 18, is free from direct ejection of the contents of the battery through the opening 17, because the contents are accumulated in the inner side of the cover 18 even if the contents of the battery, such as the electrolyte, are ejected. Since the opening 17 of the nonaqueous-electrolyte battery is covered with the cover 18 and thus the opening 17 cannot be recognized from outside, a needle-type member cannot be inserted into the opening 17. As a result, the safety valve cannot unintentionally or intentionally be pierced.

As can be understood from the description above, the nonaqueous-electrolyte battery according to the present invention has the structure such that the opening formed on the battery cover is covered with the insulating cover at a position at which the opening cannot directly be recognized from the outside. Therefore, even if the gas is ejected from the inside portion of the battery, direct ejection of the contents, such as the electrolyte, can be prevented. Moreover, the safety valve cannot be pierced from the outside. Consequently, the safety can be improved.

What is claimed is:

1. A battery comprising: a battery can including a top opening bounded by a peripheral lip and defining an electrode receiving cavity, an electrode assembly including at least one anode, at least one cathode, and at least one separator disposed between the anode and the cathode, the electrode assembly being disposed in the electrode receiving cavity, an electrolyte disposed in the electrode receiving cavity, a safety valve disposed in the electrode receiving cavity adjacent the top opening, a battery cover including a raised central portion disposed in the top opening and sealably closing off the top opening and defining a first venting chamber between the safety valve and the raised central portion, a secondary cover member disposed on an outside surface of the battery cover extending between the raised central portion and the peripheral lip and defining a second venting chamber under the secondary cover member, said raised central portion including an opening connecting the first venting chamber and the second venting chamber.

2. A battery as defined in claim 1, wherein said battery cover has a profiled configuration including a central cylindrical projection, a peripheral flat portion disposed radially outwardly from the cylindrical projection and an intermediate stepped side portion therebetween and said opening is disposed in the stepped side portion.

3. A battery as defined in claim 1, wherein said safety valve includes a rupturable membrane which ruptures when an internal pressure in the battery can exceeds a predetermined internal pressure.

4. A battery as defined in claim 1, wherein said anode comprises an active anode material selected from lithium or an alloy of lithium.

5. A battery as defined in claim 1, wherein said cathode comprises manganese dioxide as a cathode active material.

6. A battery as defined in claim 1, wherein said separator comprises a micro porous polyethylene film.

7. A battery as defined in claim 1, wherein said electrolyte comprises a solution of $LiCF_3SO_3$ in a mixed solvent including propylene carbonate and dimethoxyethane.

8. A battery as defined in claim 1, wherein said battery can has a generally upstanding cylindrical configuration.

* * * * *